United States Patent
Martinelli et al.

(10) Patent No.: US 12,114,044 B2
(45) Date of Patent: Oct. 8, 2024

(54) DIGITAL VIDEO ANALYSIS

(71) Applicant: Google LLC, Mountain View, CA (US)

(72) Inventors: Andrea Martinelli, Zurich (CH);
Masoud S. Loghmani, San Mateo, CA (US); Roland Peter Kehl, Gachnang (CH); Bernhard Rudolf Suter, Zürich (CH); Daniel Cotting, Islisberg (CH); Dan Filimon, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/801,323

(22) PCT Filed: Sep. 16, 2021

(86) PCT No.: PCT/US2021/050588
§ 371 (c)(1),
(2) Date: Aug. 22, 2022

(87) PCT Pub. No.: WO2022/060930
PCT Pub. Date: Mar. 24, 2022

(65) Prior Publication Data
US 2023/0081938 A1  Mar. 16, 2023

Related U.S. Application Data

(60) Provisional application No. 63/079,377, filed on Sep. 16, 2020.

(51) Int. Cl.
*H04N 21/466* (2011.01)
*H04N 21/482* (2011.01)
*H04N 21/8405* (2011.01)

(52) U.S. Cl.
CPC ..... *H04N 21/4668* (2013.01); *H04N 21/4661* (2013.01); *H04N 21/4826* (2013.01); *H04N 21/8405* (2013.01)

(58) Field of Classification Search
CPC .......... H04N 21/4668; H04N 21/4661; H04N 21/4826; H04N 21/8405
(Continued)

(56) References Cited

U.S. PATENT DOCUMENTS 8,260,117 B1 * 9/2012 Xu ................ H04N 21/4668
386/343
8,484,203 B1 * 7/2013 Clancy .............. G06F 16/435
707/723

(Continued)

FOREIGN PATENT DOCUMENTS

CN  109271512  1/2019
CN  109376269  2/2019

(Continued)

OTHER PUBLICATIONS

International Search Report and Written Opinion in International Appln. No. PCT/US2021/050588, dated Nov. 24, 2021, 14 pages.

(Continued)

*Primary Examiner* — Nnenna N Ekpo
(74) *Attorney, Agent, or Firm* — Fish & Richardson P.C.

(57) ABSTRACT

This disclosure relates to digital video analysis. In one aspect, a method includes receiving data indicating one or more seed video groups that each include one or more seed videos. Data indicating one or more keywords is received. A set of candidate video groups that each include one or more candidate videos is identifier. For each candidate video group in the set of candidate video groups a co-interaction score and a topicality score are determined. A subset of the candidate videos groups is selected based on the co-interaction score and the topicality score of each candidate video group. Data indicating the subset of candidate video groups is provided for presentation.

21 Claims, 9 Drawing Sheets

(58) Field of Classification Search
USPC .......................................................... 725/144
See application file for complete search history.

(56) References Cited

U.S. PATENT DOCUMENTS

| | | | |
|---|---|---|---|
| 8,615,450 | B1 | 12/2013 | Fanelli |
| 10,373,176 | B1 | 8/2019 | Wei et al. |
| 2008/0086456 | A1* | 4/2008 | Rasanen ............ H04N 21/4622 348/E7.071 |
| 2008/0154889 | A1 | 6/2008 | Pfeiffer |
| 2009/0006542 | A1 | 1/2009 | Feldman et al. |
| 2009/0164419 | A1* | 6/2009 | Taylor .................... G06Q 30/02 707/999.005 |
| 2009/0319512 | A1 | 12/2009 | Baker et al. |
| 2011/0208750 | A1 | 8/2011 | Miyazaki |
| 2013/0071087 | A1 | 3/2013 | Motiwala et al. |
| 2013/0263006 | A1 | 10/2013 | McCoy et al. |
| 2014/0122502 | A1 | 5/2014 | Kalmes et al. |
| 2016/0373814 | A1 | 12/2016 | Kellner |
| 2017/0060870 | A1* | 3/2017 | Checkley ............ G06F 16/9535 |
| 2023/0107935 | A1 | 4/2023 | Martinelli et al. |

FOREIGN PATENT DOCUMENTS

| | | |
|---|---|---|
| CN | 111368141 | 7/2020 |
| CN | 111432282 | 7/2020 |
| EP | 3690674 | 8/2020 |
| JP | 2004-194108 | 7/2004 |
| JP | 2009-140010 | 6/2009 |
| JP | 2010-506299 | 2/2010 |
| JP | 2011-508319 | 3/2011 |
| JP | 2015-513736 | 5/2015 |
| JP | 2020-519055 | 6/2020 |
| WO | WO 2013/126589 | 8/2013 |
| WO | WO 2015054627 | 4/2015 |

OTHER PUBLICATIONS

International Search Report and Written Opinion in International Appln. No. PCT/US2021/050630, dated Nov. 18, 2021, 12 pages.
Office Action in Chinese Appln. No. 202180019890.9, dated Jul. 8, 2023, 24 pages (with English translation).
Office Action in European Appln. No. 21798486.3, dated Aug. 10, 2023, 6 pages.
International Preliminary Report on Patentability in International Appln. No. PCT/US2021/050588, mailed on Mar. 30, 2023, 8 pages.
International Preliminary Report on Patentability in International Appln. No. PCT/US2021/050630, mailed on Mar. 30, 2023, 7 pages.
Office Action in Canadian Appln. No. 3,175,544, mailed on Nov. 28, 2023, 4 pages.
Office Action in Chinese Appln. No. 202180019890.9, mailed on Nov. 25, 2023, 20 pages (with English translation).
Office Action in Indian Appln. No. 202227046776, mailed on Nov. 2, 2023, 8 pages (with English translation).
Office Action in Japanese Appln. No. 2022-554666, mailed on Oct. 30, 2023, 12 pages (with English translation).
Office Action in Japanese Appln. No. 2022-556217, mailed on Nov. 20, 2023, 13 pages (with English translation).
Office Action in Chinese Appln. No. 202180019890.9, mailed on Feb. 21, 2024, 25 pages (with English translation).
Office Action in Japanese Appln. No. 2022-554666, mailed on Mar. 11, 2024, 6 pages (with English translation).
Office Action in Japanese Appln. No. 2022-556217, mailed on Apr. 22, 2024, 13 pages (with English translation).
Office Action in Korean Appln. No. 10-2022-7030757, mailed on Mar. 27, 2024, 10 pages (with English translation).

* cited by examiner

DIGITAL VIDEO ANALYSIS

CROSS-REFERENCE TO RELATED APPLICATION

This application is a National Stage Application under 35 U.S.C. § 371 and claims the benefit of International Application No. PCT/US2021/050588 filed Sep. 16, 2021, which claims priority to U.S. Application No. 63/079,377, filed Sep. 16, 2020. The disclosures of the foregoing applications are hereby incorporated by reference in their entirety.

BACKGROUND

This specification relates to a data processing system and analyzing groups of digital videos.

Some online video platforms enable users to create channels of multiple digital videos that other users of the platform can watch. A user can subscribe to a video channel in order to receive videos published by the channel. For example, a user's subscription feed can include videos recently published by the channels to which the user has subscribed. A channel of an online video platform is similar to a show or program of traditional media and individual video content of the channel is similar to an episode of the show or program.

SUMMARY

In general, one aspect of the subject matter described in this specification can be embodied in methods that include receiving data indicating one or more seed video groups that each include one or more seed videos; receiving data indicating one or more keywords; identifying a set of candidate video groups that each include one or more candidate videos; for each candidate video group in the set of candidate video groups: determining a co-interaction score that represents a measure of how often users who interacted with the one or more seed videos of the one or more seed video groups interacted with the one or more videos of the candidate video group; and determining a topicality score that represents a measure of topicality between the one or more keywords and the one or more videos of the candidate video group; selecting a subset of the candidate videos groups based on the co-interaction score and the topicality score of each candidate video group; and providing data indicating the subset of candidate video groups for display. Other implementations of this aspect include corresponding apparatus, systems, and computer programs, configured to perform the aspects of the methods, encoded on computer storage devices.

These and other implementations can each optionally include one or more of the following features. Some aspects include receiving, from a computing system of a digital component provider, data indicating a user selection of a given candidate video group of the subset of candidate video groups; including the given candidate video group in a video group package; and distributing digital components of the digital component provider to client devices for presentation with at least one of the one or more videos in the given candidate video group.

In some aspects, determining the co-interaction score for each candidate video group includes determining the co-interaction score for each candidate video group using collaborative filtering. In some aspects, determining the co-interaction score for each candidate video group includes determining a quantity of user interactions with the one or more videos of the candidate video group that were performed by users who also interacted with videos of the one or more seed video groups.

In some aspects, the one or more seed video groups include one or more positive seed video groups and one or more negative seed video groups. Determining the co-interaction score for each candidate video group can include determining a first quantity of user interactions with the one or more videos of the candidate video group that were performed by users who also interacted with videos of the one or more positive seed video groups; determining a second quantity of user interactions with the one or more videos of the candidate video group that were performed by users who also interacted with videos of the one or more negative seed video groups; and determining the co-interactions score for the candidate video group based on the first quantity and the second quantity. Each seed video group and each candidate video group can include a respective video channel of the video sharing platform. Each user interaction can include a subscription to one of the video channels.

In some aspects, the co-interaction score for each candidate video group is based on a similarity between patterns of user interactions with the one or more seed videos of the one or more seed video groups and patterns of user interactions with the one or more videos of the candidate video group. Each pattern of user interaction can be based on at least one of display times of videos, a frequency at which each video is displayed, or subscriptions to video groups.

In some aspects, each candidate video includes one or more annotations selected based on at least one of (i) content of the candidate video, (ii) a title of the candidate video, (iii) a description of the candidate video, or (iv) user comments posted about the candidate video. Determining the topicality score that represents the measure of topicality between the one or more keywords and the one or more videos of the candidate video group comprises determining a quantity of the one or more videos in the candidate video group that has an annotation that includes at least one of the one or more keywords. Determining the topicality score that represents the measure of topicality between the one or more keywords and the one or more videos of the candidate video group can include determining a ratio between (i) the quantity of the one or more videos in the candidate video group that has an annotation that includes at least one of the one or more keywords and (ii) a quantity of the one or more videos in the candidate video group that does not have an annotation that includes at least one of the one or more keywords. Some aspects include receiving data indicating a set of one or more negative keywords; for each candidate video group, determining an anti-topicality score that represents a measure of topicality between the one or more negative keywords and the one or more videos of the candidate video group; and filtering, from the set of candidate video groups, each candidate video group having an anti-topicality score that satisfies a threshold.

The subject matter described in this specification can be implemented in particular embodiments so as to realize one or more of the following advantages. The seed-based video analysis techniques described in this document enable the identification, from thousands or millions of diverse video groups (e.g., video channels), of video groups having particular features that would otherwise be impossible or impractical using allow-lists or categories. For example, the techniques enable the identification of video groups that express a particular mood, aesthetic, user taste, and/or granular topics (e.g., recent or upcoming events).

These techniques provide a scalable solution for identifying, selecting, and packaging video groups that have particular features (e.g., particular co-interaction patterns, moods, aesthetics, and/or topicality) without requiring users to browse through many (e.g., thousands or millions) of individual videos or video channels, which reduces the computational burden placed on servers to provide information about each video group and reduces network bandwidth consumed by transmitting such information to client computing systems. Aggregated over many users, e.g., thousands or millions, these computational and network bandwidth savings can be substantial.

Using seed video groups, e.g., in combination with refinement techniques that allow users to select positive and/or negative video groups and/or keywords, enables the accurate selection of video groups having the particular features. By accurately selecting video groups using these techniques, the system can save network resources and associated overhead by not transferring videos and/or other content to client devices that will not be viewed by users. For example, by accurately packaging video groups that align with the goal(s) for the package, videos and/or content associated with video groups that do not align with the goal(s) can be prevented from being distributed to users that are interested in videos that align with the goals and the computational and network resources associated with the transmission of these videos and/or content can be preserved for other tasks.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for identifying video groups using seed video groups and keywords. Each video group can include one or more digital videos. The seed keywords can be keywords that represent various concepts or attributes of a video group that in turn define the topic of the given video group. The system can identify candidate video groups based at least in part on a co-interaction score that represents a measure of how often users who interacted with the one or more seed videos of the seed video groups, or with the video groups directly, interacted with the one or more videos in the collection of the candidate video groups, or with one or more video groups in the collection of candidate video groups, and/or a topicality score that represents a measure of topicality between the one or more keywords and the one or more videos of the candidate video group.

The system can provide user interfaces that enable the user to specify the seed video groups and the keywords. The user interfaces can include user interface controls that enable the user to refine the identified video groups, e.g., by selecting positive and/or negative video groups and/or selecting positive and/or negative keywords. Positive and negative keywords can be used to calculate a collective topicality score and/or a collective anti-topicality score for a video group. Positive and negative seed video groups can be used to calculate a co-interaction score to determine video-groups that are more likely to have co-interaction with the positive seeds and less likely to have co-interaction with negative seeds. The system can use the user selections to update the co-interaction scores and/or the topicality scores for the candidate video groups and identify an updated set of candidate video groups using the updated scores. In this way, users can refine the list, e.g., iteratively, using video groups and/or keywords that align with their goal for a package of candidate video groups.

The system can then enable content providers to provide content with videos of video groups selected for inclusion in a video group package. For example, a content provider (or other entity) can link digital components with a video group package such that the digital components are provided for display, e.g., presentation, with videos of the video groups when the videos are played at client devices of users.

Figure 1:
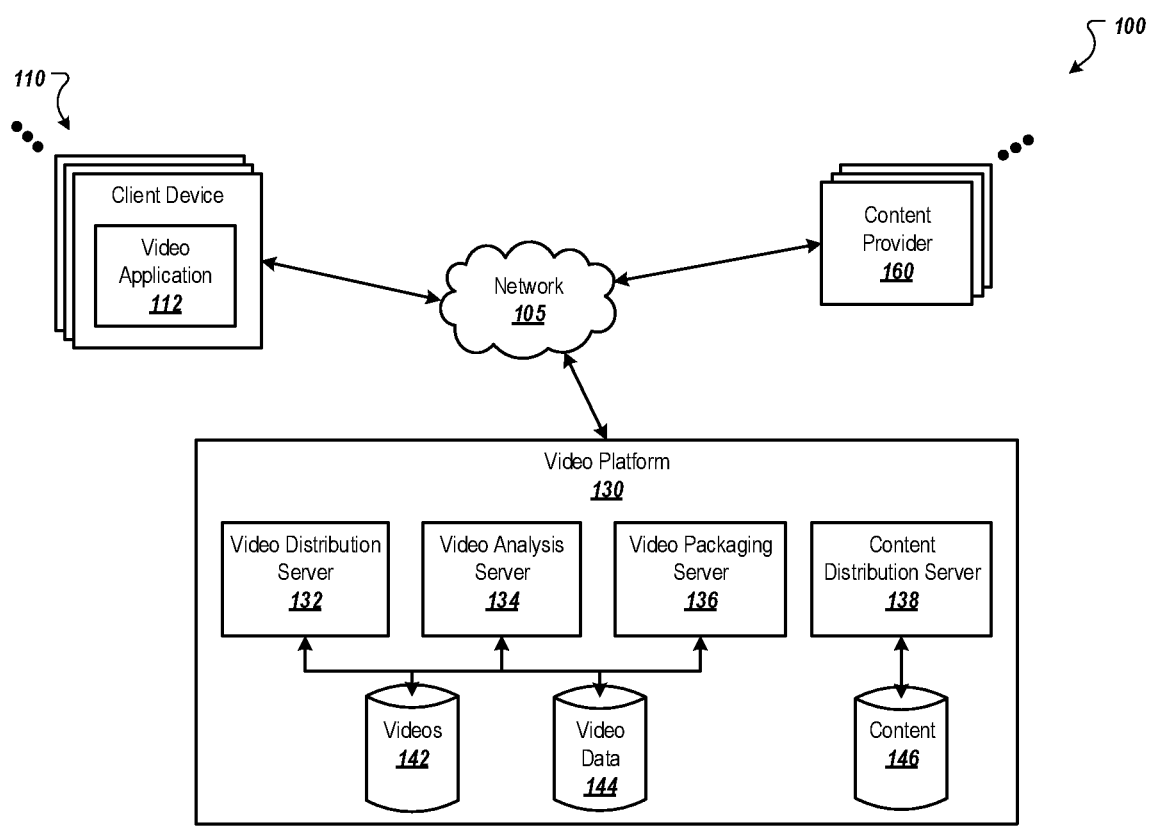
FIG. 1 is a block diagram of an environment in which a video platform provides access to videos.

FIG. 1 is a block diagram of an environment 100 in which a video platform 130 provides access to videos. The example environment 100 includes a data communication network 105, such as a local area network (LAN), a wide area network (WAN), the Internet, a mobile network, or a combination thereof. The network 105 connects client devices 110, the video platform 130, and computing systems of content providers 160. The example environment 100 can include many different client devices 110 and content providers 160.

A client device 110 is an electronic device that is capable of communicating over the network 105. Example client devices 110 include personal computers, mobile communication devices, e.g., smart phones, and other devices that can send and receive data over the network 105. A client device can also include a digital media device, e.g., a streaming device that plugs into a television or other display to stream videos to the television.

A client device 110 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually display information, e.g., videos. The digital assistant can be implemented in different forms of hardware devices including, a wearable device (e.g., watch or glasses), a smart phone, a speaker device, a tablet device, or another hardware device.

A client device 110 typically includes applications, such as web browsers and/or native applications, to facilitate the sending and receiving of data over the network 105. A native application is an application developed for a particular platform or a particular device (e.g., mobile devices having a particular operating system). A client device 110 can include a video application 112, which can be a native application for playing digital videos or a web browser that plays digital videos of web pages.

A content provider 160 can create and publish content for display at client devices 110. For example, a content provider 160 can create content for display with videos played at the client devices 110. The content can include video content that is displayed before, during breaks in, or after another video being displayed at the client device 110. The content can include image, text, or video content displayed within an electronic resource that also includes a video. For example, the video application 112 can display a video channel or a subscription feed to a user. A video channel or subscription feed can include multiple videos. In addition to displaying the videos, a web page or application that displays the video channel or subscription feed can include additional content displayed on screen with the videos, e.g., adjacent to the videos. Similarly, the content can be displayed on screen with a single video.

The content can include digital components. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource displayed by the application 112. More specifically, the digital component may include digital content that is relevant to the resource content (e.g., the digital component may relate to the same topic as the web page content, or to a related topic). The provision of digital components can thus supplement, and generally enhance, the web page or application content.

The video platform 130 provides videos for display at the client devices 110. The video platform 130 includes a video distribution server 132, a video analysis server 134, a video packaging server 136, and a content distribution server 138. Each server can be implemented using one or more computer systems, e.g., the computer system 900 of FIG. 9. Although the content distribution server 138 is shown as being part of the video platform 130, the content distribution server 138 can be part of a separate system and/or operated by a different party than the video platform 130.

In some implementations, the video platform 130 is an online video sharing platform. For example, the videos can include videos created by users and uploaded to the video platform 130. Users of the video platform 130 can create video channels that each include one or more videos. A video channel is one type of video group. A video group can include a single video or a set of videos. Other users of the video platform 130 can subscribe to a video channel in order to receive videos published by the channel. In some implementations, a subscription may not be required to view videos of the channel but instead can be used to aggregate videos for a particular user in the user's subscription feed. In other examples, a subscription may be required for some video channels. The videos are stored in a video data storage device 142, e.g., one or more hard drives, flash memory, etc.

The video distribution server 132 can provide videos for display at the client devices 110. For example, the video distribution server 132 can receive requests for videos from the video applications 112 and provide the requested videos in response to the requests. In another example, a user can navigate to their subscription feed and the video distribution server 132 can provide videos (or video control user interface elements that enable the user to start the videos) for display in a subscription feed user interface. In yet another example, a user can navigate to a video channel and the video distribution server 132 can provide videos (or video control user interface elements for the videos) of the video channel for display in a video channel user interface. If the user interacts with a video control user interface element, e.g., by selecting a play control, the video distribution server 132 can stream the video to the video application 112 for display at the client device 110.

The video packaging server 136 enables content providers 160, users of the video platform 130, or users (e.g., administrators) of the content distribution server 138 to create packages of video groups. A content provider 160 can then link content (e.g., digital components) to a video group package so that the content is displayed with the videos of the video groups of the video group package. For example, a content provider 160 can create a video group package and link one or more digital components to the video group package. In another example, a user of the video platform 130 or content distribution server 138 can create a video group package and make the video group package available to content providers, e.g., in exchange for a fee.

The video packaging server 136 can interact with a video analysis server 134 to identify and suggest candidate video groups for inclusion in a video group package based on inputs from a user (e.g., a user from the content provider 160, video platform 130 or content distribution server 138). The inputs can include data identifying seed video groups and/or seed keywords (which are also referred to as keywords for brevity).

A seed video group can include one or more videos of the video platform 130. For example, a seed video group can include an individual video, a video channel, or other group of multiple videos. The seed video groups enable the user to define or signal the types of video groups with which the user wants to have similar user interaction patterns as video groups in the video group package. The video packaging server 136 can enable the users to select positive seed video groups and negative seed video groups, as described below.

The keywords can be used to define topics for the video group package. For example, the user can enter or select keywords based on topics for the video group package. As described in more detail below, the video platform 130 can provide user interfaces that suggest channels and keywords that can be used to refine the video group package. The video packaging server 136 can enable the users to specify positive keywords (e.g., topical keywords) and negative keywords (e.g., anti-topical keywords), as described below.

The video analysis server 134 can identify candidate video groups based on the seed videos and/or the keywords. In some implementations, the video analysis server 134 can determine one or more scores for each video group in a set of video groups based on the seed video groups and/or the keywords and select candidate video groups based on the score(s).

For example, the video analysis server 134 can determine, for each video group, a co-interaction score based on the seed video(s) of the seed video group(s) and the video(s) of the candidate video group. This co-interaction score can represent how likely it is that users who interacted with the seed video(s) of the seed video group(s) will have similar interactions with the candidate video(s) of the candidate video group. As described in more detail below, this co-interaction score can be determined using collaborative filtering techniques. For example, the co-interaction score can represent a measure of how often users who interacted with the seed video(s) of the seed video group(s) interacted with the video(s) of the video group.

If negative seed video groups are used, the co-interaction score for a candidate video group can reflect or measure the likelihood that the candidate video group will have co-interaction with the positive seed video groups and the candidate video group will not have co-interaction with negative video seed groups. That is, the co-interaction score can be used to determine video groups that are more likely to have co-interaction with the positive video see groups and less likely to have co-interaction with negative seed video groups.

The video analysis server 134 can also determine, for each video group, a topicality score that represents a measure of topicality between the selected keywords and the video(s) of the video group. This topicality score can be based on annotations assigned to the video(s) of the video group and the specified keywords. For example, the topicality score can be based on, e.g., equal to or proportional to, the quantity of videos in the video group that are assigned annotations that match at least one of the specified keywords. In another example, the topicality score can be based on, e.g., proportional to, a ratio between the quantity of videos in the video group that are assigned annotations that match at least one of the specified keywords and the quantity of videos in the video group that does not have an annotation that includes at least one of the specified keywords. In some implementations, the video analysis server 134 can also determine an anti-topicality score for each video group in a similar manner but using negative keywords instead of positive keywords.

The video analysis server 134 can analyze the videos to assign the annotations to the videos. For example, the video analysis server 134 can assign, as annotations, keywords to each video based on content of the video, the title of the video, a description of the video, user comments posted about the video on the video platform 130, titles of co-watched videos (e.g., videos watched by the same user as the video), descriptions of co-watched videos, search queries that resulted in a display of the video, and/or other appropriate content related to the video.

In a particular example, the video analysis server 134 can use computer vision and/or machine learning techniques to analyze images of a video to determine what the video is about (e.g., the topic of the video) and/or recognize entities (e.g. people, objects, etc.) in the images. The video analysis server 134 can assign the entities as annotations for the video. In another example, the video analysis server 134 can compare the recognized entities the knowledge graph entities of a knowledge graph and assign any matching knowledge graph entities as the annotations for the video. A knowledge graph is a graph of entities in which each entity is represented by a node and edges between entities indicate that the entities are related.

The video analysis server 134 can similarly recognize entities in audio of the video and the associated text (e.g., title, description, etc. discussed above), compare those entities to knowledge graph entities of the knowledge graph, and assign any matching knowledge graph entities as annotations for the video. The video analysis server 134 can store the annotations for each video in a video information data storage device 144, e.g., one or more hard drives, flash memory, etc.

The video packaging server 136 can select a number of the video groups as candidate video groups for the video group package and provide data for the video groups to the computing system. The user can then select from the candidate video groups and/or refine the candidate video groups based on additional seed video groups and/or keywords until satisfied with the candidate video groups, as described in more detail below. The video packaging server 136 can store data specifying the video group package, e.g., including data indicating each video group in the video group package, in the video information data storage device 144.

The video packaging server 136 can enable the user to assign digital components to the video group package. For example, the user can select digital components for display with the videos of the video groups in the video group package and assign them to the video group package. In a particular example, a content provider 160 can create a video group package for a particular context in which the content provider 160 wants the digital components to be displayed. The content provider 160 can then assign the digital components to the created video group package. The video packaging server 136 can store data specifying the assignment of digital components to video group packages in the video information data storage device 144. The digital components, or data that instructs a client device 110 to download the digital components, can be stored in a content data storage device, e.g., one or more hard drives, flash memory, etc.

When videos are provided for display at client devices 110, the content distribution server 138 can select content for display with the videos. This selection can be based in part on digital components assigned to the video group packages. For example, if the video distribution server 132 is updating a user interface of the video application 112 on a client device 112 to display a given video group, e.g., given video channel, the content distribution server 138 can select a digital component assigned to the given video group for display by the video application 112 e.g., within the user interface with the videos of the given video group. In some implementations, additional criteria, such as selection parameters (e.g., bids) can be used to select the digital components.

Figure 2:
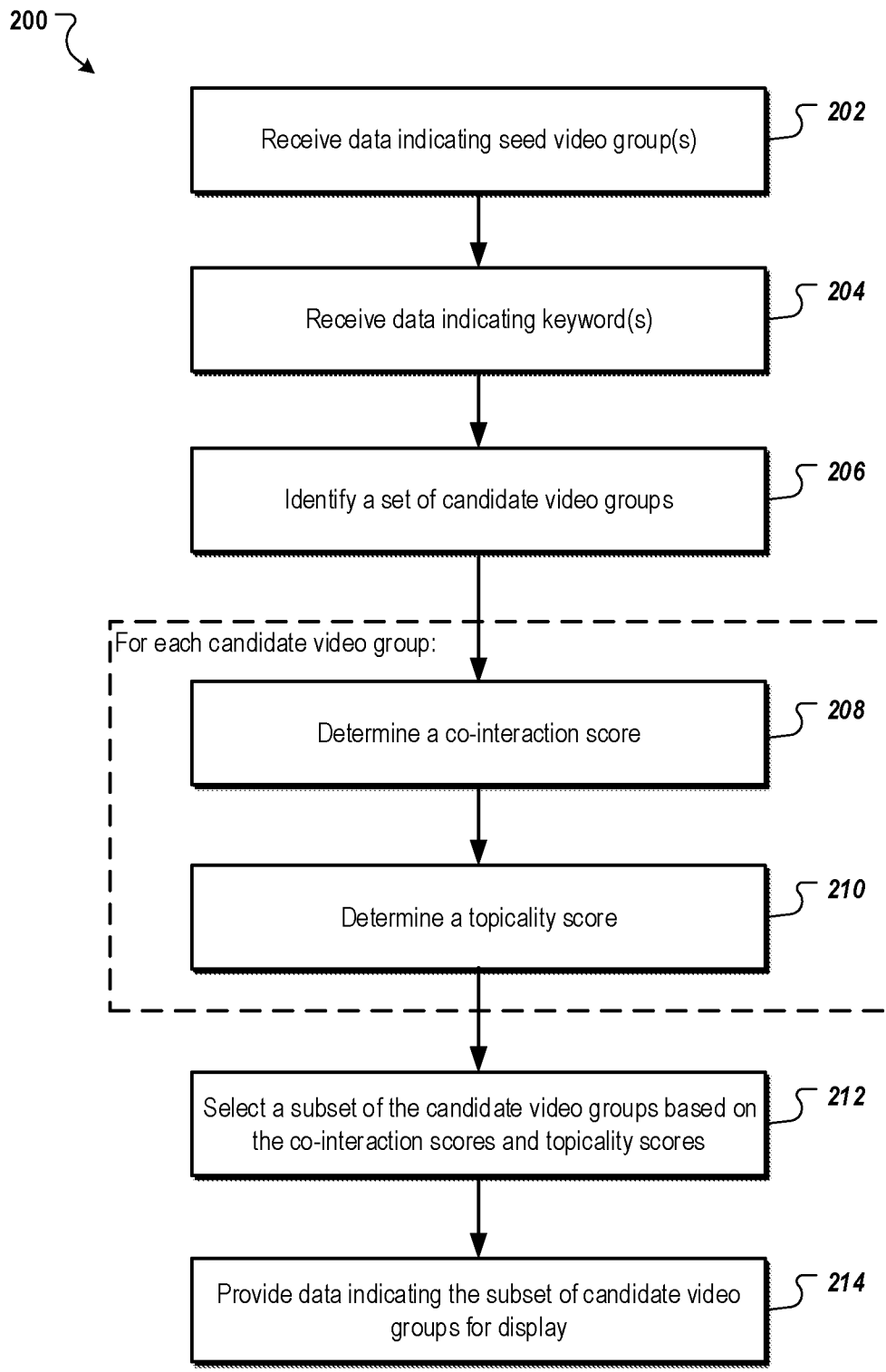
FIG. 2 is a flow diagram that illustrates an example process for selecting target video groups and providing data about the target video groups.

FIG. 2 is a flow diagram that illustrates an example process 200 for selecting target video groups and providing data about the target video groups. Operations of the process 200 can be implemented, for example, by the video platform 130. Operations of the process 200 can also be implemented as instructions stored on one or more computer readable media which may be non-transitory, and execution of the instructions by one or more data processing apparatus can cause the one or more data processing apparatus to perform the operations of the process 200.

Data indicating one or more seed video groups is received (202). The video platform can provide a user interface that enables a user to enter seed video groups or select seed video groups from a set of video groups. For example, if the video platform is an online video platform, the user interface can enable the user to enter an address, e.g., a Universal Resource Locator (URL), for the seed video group. In another example, the user interface can enable the user to search for video groups and select video groups from search results as the seed video groups. Each seed video group can include one or more videos. For example, a seed video group can be an individual video or a video channel that includes multiple videos.

Data indicating one or more keywords is received (204). The video platform can provide a user interface that enables the user to enter keywords or select keywords from a set of keywords. For example, the video platform 130 can enable the user to search for keywords, e.g., based on topic, and the user can select keywords from the search results. The keywords can be knowledge graph entities of a knowledge graph.

A set of candidate video groups is identified (206). The candidate video groups can be video groups eligible for selection for inclusion in a video group package. Each candidate video group can include one or more videos. For example, a candidate video group can be an individual video or a video channel that includes multiple videos. A candidate video group can be the same as, or different from, a seed video group. For example, both types of video groups can be selected from the same set of video groups, e.g., video groups of an online video sharing platform.

A co-interaction score is determined for each candidate video group (208). The co-interaction score can be determined using collaborative filtering techniques. For example, the co-interaction score for a candidate video group can represent a measure of how often users who interacted with the seed video(s) of the seed video group(s) also interacted with the video(s) of the candidate video group. The co-interaction score can be based on similar interactions between the users with respect to both types of video groups.

The interactions used to determine the co-interaction technique can include one or more types of user interactions. In some implementations, when the video groups are video channels, the user interactions can be subscriptions. For example, the co-interaction score for a candidate video channel represents a measure of how often users who subscribed to the seed video channel(s) also subscribed to the candidate video channel. This co-interaction score can be based on the quantity of users who subscribed to the seed video channel(s) who also subscribed to the candidate video channel. In another example, this co-interaction score can be based on a ratio between (i) the quantity of users who subscribed to the candidate video channel and at least one seed video channel and (ii) the total quantity of users in the population of users who subscribed to at least one seed video channel or the candidate video channel. In these examples, a candidate video channel that has more users who also subscribed to one or more of the seed video channels can have a higher score than a candidate video channel that has fewer users who also subscribed to one or more of the seed video channel(s).

In another example, the user interactions can be views of the videos, e.g., if the video groups are individual videos. For example, the co-interaction score for a candidate video can be based on, e.g., equal to or proportional to, the quantity of users who watched both the candidate video and at least one seed video. In another example, the co-interaction score for a candidate video can be based on, e.g., equal to or proportional to, the quantity of seed videos that have been viewed by users who also watched the candidate video. In yet another example, the co-interaction score for a candidate video can be based on a ratio between (i) the quantity of users who watched both the candidate video and at least one seed video and (ii) the total quantity of users in the population of users that watched at least one seed video or the candidate video.

In some implementations, the co-interaction score for a candidate video group is based on the similarity between patterns of user interactions with the video(s) of the candidate video group and patterns of user interactions with the video(s) of each seed video group. These patterns can be based on subscriptions to video groups, the frequency with which the users watch the videos in the groups, and the duration of time the users watch the videos in the video groups.

To determine this co-interaction score, the video platform can determine an aggregate pattern for each candidate video. The aggregate pattern for a candidate video group can be based on, or include, the average duration that users view the video(s) of the candidate video group, the frequency at which the users who watched videos of the candidate video group return to watch videos of the candidate video group, and/or the percentage of the users who subscribe to the candidate video group. The aggregate pattern for each seed video group can include the same or similar pattern information. The video platform can then compare the pattern for the candidate video group to the pattern for each seed video group can determine a co-interaction score that is based on the similarity between the pattern for the candidate video group to the pattern for each seed video group.

In some implementations, the co-interaction score for a candidate video group can be based on positive seed video groups and negative seed video groups, e.g., selected by a user. A positive seed video group is a video group for which selected candidate video groups should be similar. A negative seed video group is a video group for which selected candidate video groups should be dissimilar. That is, the user can select positive seed video groups that are like the video groups for which the user would like to include in a video group package. The user can similarly select negative video groups for which the user does not want similar video groups included in the video group package.

In this example, the co-interaction score for a candidate video group can have a positive correlation with the similarity of the user interactions with a positive seed video group (e.g., based on subscriptions, view durations, frequency at which the users who watched videos, and/or patterns, as described above). Similarly, the co-interaction score for a candidate video group can have a negative correlation with the similarity of the user interactions with a positive seed video group (e.g., based on subscriptions, view durations, frequency at which the users who watched videos, and/or patterns, as described above).

A topicality score is determined for each candidate video group (210). The topicality score for a candidate video group can represent a measure of topicality between the one or more keywords and the video(s) of the candidate video group. As described above, each video can include annotations based on the content of the video, text associated with the video, etc. The topicality score for a candidate video can be based on, e.g., equal to or proportional to, the quantity of videos in the video group that are assigned annotations that match at least one of the keywords. In another example, the topicality score can be based on, e.g., proportional to, a ratio between the quantity of videos in the video group that are assigned annotations that match at least one of the keywords and the quantity of videos in the video group that does not have an annotation that includes at least one of the keywords. In another example, the topicality score for a candidate video can be based on, e.g., equal to or proportional to, the quantity of annotations of the video(s) in the candidate video group that match at least one of the keywords.

In some implementations, an anti-topicality score is also determined for each candidate video group. For example, the keywords can include positive keywords (e.g., topical keywords) and negative keywords (e.g., anti-topical keywords). The user can select positive keywords that reflects the topics (or entities) of video groups that the user wants to include in a video group package. Similarly, the user can select negative keywords for topics (or entities) of video groups that user does not want to include in the video group package.

The video platform can calculate the topicality score using the positive keywords and calculate the anti-topicality score using the negative keywords. For example, the topicality score can be based on the quantity of videos in the video group that are assigned annotations that match at least one of the positive keywords. The anti-topicality score can be based on the quantity of videos in the video group that are assigned annotations that match at least one of the negative keywords. The other ways in which the topicality score can be calculated described above can also be used, using the positive keywords for the topicality score and the negative keywords for the anti-topicality score.

A subset of the candidate video groups is selected (212). The subset of candidate video groups can be selected based on the co-interaction score for each candidate video group and the topicality score for each candidate video group. For example, the video platform can calculate a total score for each candidate video group based on the co-interaction score and the topicality score for the candidate video group. In this example, the video platform can normalize both scores to a particular score range and add the two scores together. The video platform can then select, for inclusion in the subset, a specified quantity of the candidate video groups having the highest total scores.

In some implementations, the video platform can select the candidate video groups for inclusion in the subset based on the co-interaction score, the topicality score, and the anti-topicality score for each candidate video group. In this example, the video platform can filter, from the candidate video groups, each candidate video group having an anti-topicality score that satisfies, e.g., meets or exceeds, a threshold. In another example, the video platform can determine a total score for the candidate video based on the three scores, e.g., by normalizing the scores, adding the co-interaction score to the topicality score and subtracting the anti-topicality score from the sum.

Data indicating the subset of candidate video groups is provided for display (214). For example, the video platform can update a user interface of the computing system of the user to display identifiers for the video groups in the subset and information about the video groups, e.g., the associated scores, the number of subscribers to the candidate video groups, etc.

FIGS. 3-8 illustrate a sequence of user interfaces that enable a user to create a video group package. The user interfaces enable the user to specify seed video groups and keywords to obtain an initial subset of candidate video groups selected based on the seed video groups and the keywords. The user can then refine the candidate video groups by interacting with user interface controls displayed by refinement user interfaces.

For example, the user can promote candidate video groups to positive seed video groups, demote candidate video groups to negative seed video groups, promote keywords of annotations to positive keywords, and/or demote keywords of annotations to negative keywords. The video platform 130 can update the scores for the video groups based on these refinements, select updated candidate video groups based on the refinements, and provide data for the updated candidate video groups for display to the user. The user can then make further refinements, e.g., in an iterative process until assembling a video group package with video groups that meets the user's needs.

Figure 3:
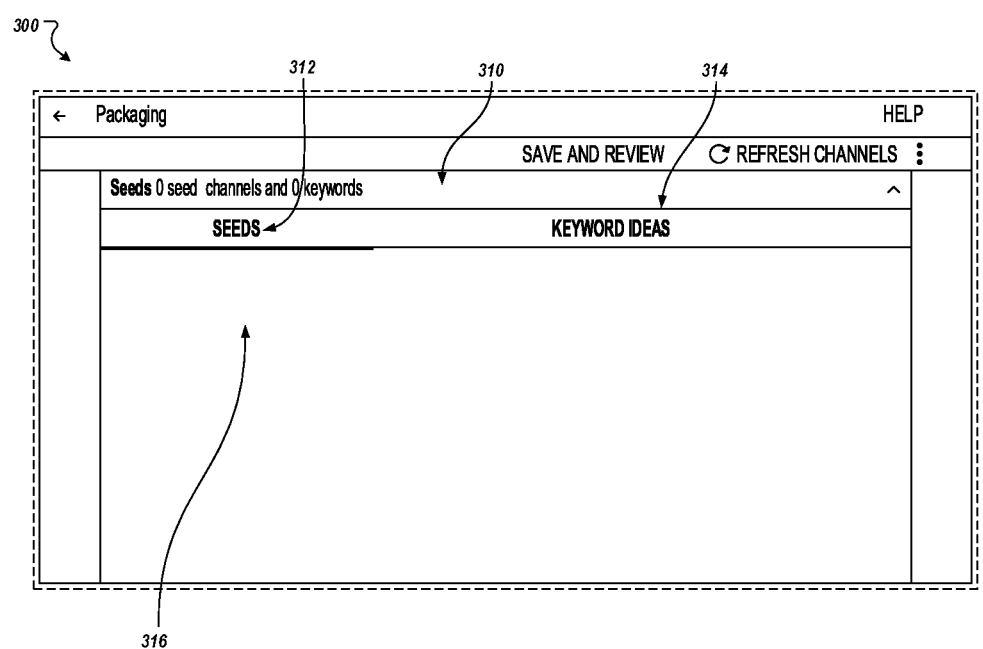
FIG. 3 is an illustration of an example user interface that enables users to identify seed videos and keywords.

FIG. 3 is an illustration of an example user interface 300 that enables users to identify seed videos and keywords. The user interface 300 includes a seeds area 310 that includes a seed video group tab 312 and a keyword tab 314. When the seed video group tab 312 is selected, the user can enter data identifying seed video groups into a seed entry area 316. For example, the user can enter, e.g., type or copy and paste, URLs of seed video groups, titles of seed video groups, or other data that identifies the seed video groups. The user interface 300 can also allow the user to group the seed video groups as positive seed video groups and negative seed video groups.

Similarly, when the keyword tab 314 is selected, the user can enter keywords into the seed entry area 316. In some implementations, the video platform 130 can update the user interface 300 to display suggested keywords based on the seed video groups. For example, when the user selects the keyword tab 314, the video platform can identify keywords based on the seed video groups and populate the seed entry area 316 with at least some of the identified keywords. The video platform 130 can identify the keywords based on the annotations of the videos in the seed video groups. For example, the video platform 130 can select, as the keywords, a specified number of the most frequently occurring annotations for the videos in the seed video groups. The user can then select positive and/or negative keywords from the keyword suggestions.

Figure 4:
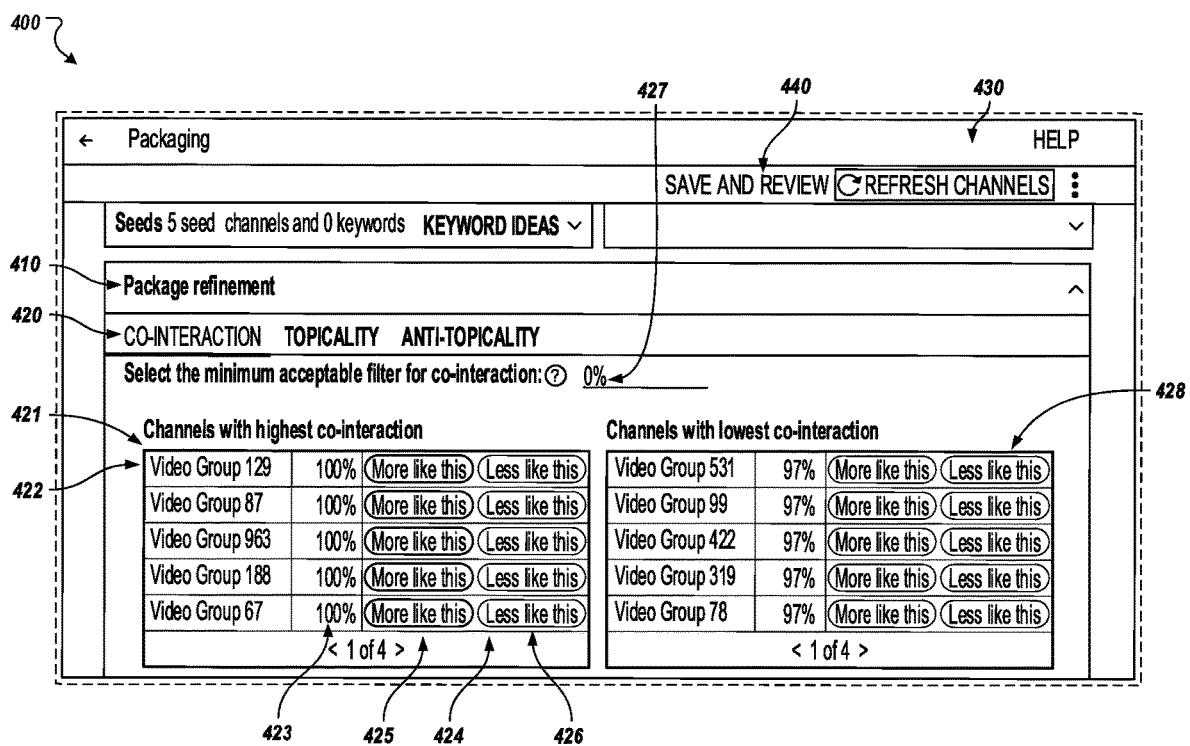
FIG. 4 is an illustration of an example user interface that enables users to refine a set of video groups based on one or more candidate video groups.

FIG. 4 is an illustration of an example user interface 400 that enables users to refine a set of video groups based on one or more candidate video groups. For example, the video platform 130 can transition from the user interface 300 of FIG. 3 to the user interface 400 (e.g. by updating the user interface 300) after the user selects the seed video groups and the keywords. Before transitioning, the video platform 130 can identify a subset of candidate video groups to display in the user interface 400, e.g., using the process 200 of FIG. 2.

The user interface 400 includes a package refinement user interface element 410 that enables the user to make selections that refine the subset of candidate video groups that will be included in a video group package. The package refinement user interface element 410 includes a co-interaction tab 420, a topicality tab, and an anti-topicality tab.

In this illustration, the co-interaction tab 420 is shown. In this tab, information about some of the identified candidate video groups are shown. In particular, a first list 421 of video groups having the highest co-interaction scores are shown and a second list 428 of video groups having the lowest co-interaction scores are shown. The candidate video groups shown in this tab can include a portion of the subset of video groups that were identified based on the seed video groups and keywords specified by the user.

The first list 421 includes, for each video group in the list, a title 422 of the video group, the co-interaction score 423 for the video group (e.g., calculated based on the seed video groups specified using FIG. 3) and user interface controls 424 that enable the user to refine the seed video groups. In particular, the user interface controls 424 include, for each candidate video group, a first user interface control 425 that enables the user to add the candidate group to the set of seed video groups as a positive seed video group. For example, if the user interacts with, e.g., selects, the first user interface control 425 for candidate video group 129, the video platform 130 can add the candidate video group 129 as a positive seed video group. This enables the video platform 130 to use the candidate video group 129 as a positive seed video group, e.g., to identify candidate video groups that have similar co-interaction patterns as the candidate video group 129.

The user interface controls 424 include, for each candidate video group, a second user interface control 426 that enables the user to add the candidate group to the set of seed video groups as a negative seed video group. For example, if the user interacts with, e.g., selects, the second user interface control 426 for candidate video group 129, the video platform 130 can add the candidate video group 129 as a negative seed video group. This enables the video platform 130 to use the candidate video group 129 as a negative seed video group, e.g., to identify candidate video groups that have co-interaction patterns that are different from the candidate video group 129. The second list 428 includes similar information (e.g., co-interaction scores) and user interface controls that enable the user to perform similar actions for the video groups having the lowest co-interaction scores.

The user interface 400 also includes a filter control 427 that enables the user to filter the video groups based on the co-interaction scores. For example, the filter control 427 enables the user to filter the candidate video groups using a minimum co-interaction score. The filter control 427 can be used to filter candidate video groups from the candidate video groups that were identified based on the seed video groups and keywords specified by the user. In another example, the filter control 427 can filter the candidate video groups displayed in the user interface 400 without filtering the candidate video groups from the identified video groups, e.g., just for display purposes.

The user interface 400 also includes a refresh channels control 430 that can be used to update the candidate video groups based on any user refinements, e.g., using the filter control 427 or the user interface controls 424. If the user interacts with, e.g., selects the refresh channels control 430, the video platform can identify an updated set of candidate videos based on the updated set of seed video groups (e.g., the original seed video groups specified by the user and any seed video groups selected using the user interface controls 424), the keywords (e.g., the original keywords specified by the user), any filter setting made using the filter control 427 (if it affects the selection of candidate video groups). For example, the video application 112 can provide this information (or just the updated information) to the video platform 130 in response to the user interaction with the refresh channels control 430. The video platform 130 can then provide data for the updated set of candidate videos to the video application 112 and update the user interface 400 to display the candidate videos in the updated set of candidate videos having the highest and lowest co-interaction scores.

The user interface 400 also includes a save and review control 440 that enables the user to save a video package group that includes the candidate video groups currently in the set of candidate video groups. For example, if the user is finished with the refinements, the user can interact with the save and review control 440 to save the video group package. This indicates a selection of the set of candidate video groups as target video groups for the video group package. The user can then assign digital components to the video group package or make the video group package available to other users.

The user interface 400 can also allow the user to interact with, e.g., select, each video group to view more information about the video group. For example, if the video application 112 or the video platform 130 receives data indicating a user interaction with a video group, the video application 112 of the video platform 130 can update the user interface 400 to display a video group information element, as shown in FIG. 5.

Figure 5:
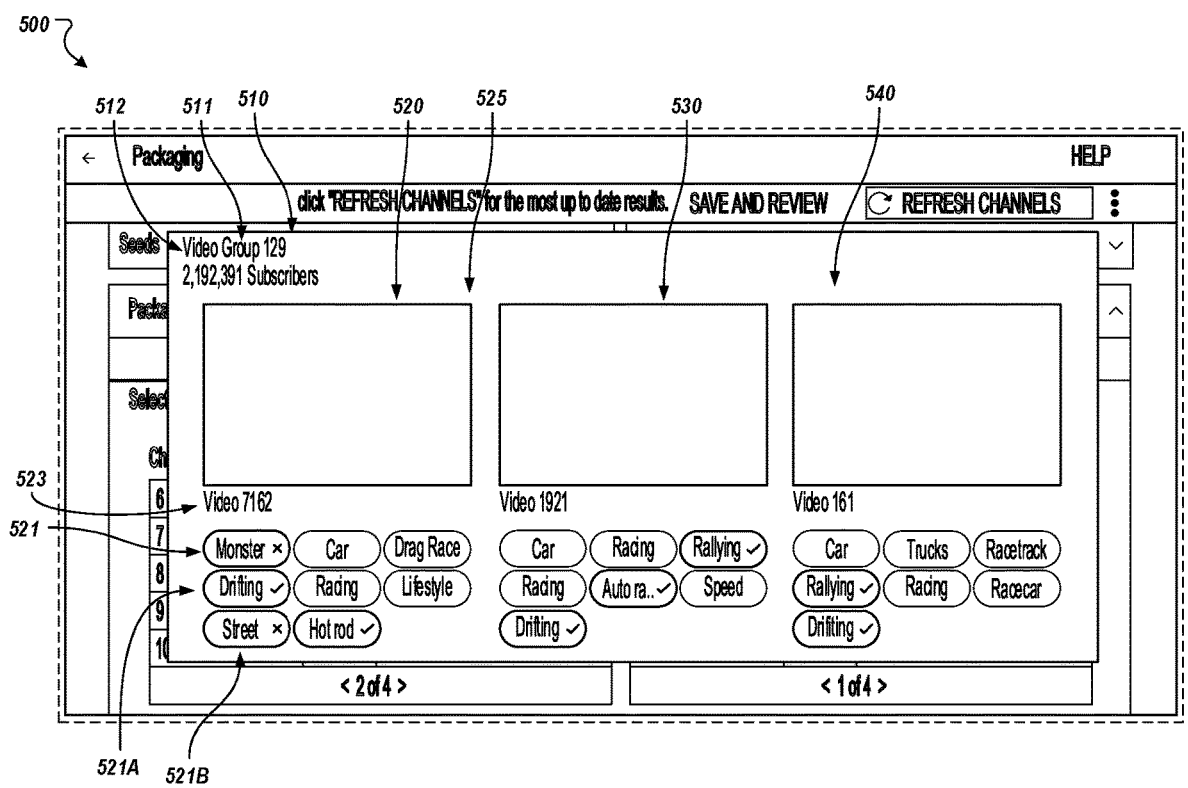
FIG. 5 is an illustration of an example user interface that displays information about a video group and enables users to refine the video group based on keywords.

FIG. 5 is an illustration of an example user interface 500 that displays information about a video group and enables users to refine the video group based on keywords. The user interface 500 includes a video group information element 510 that displays information about the selected video group ("Video Group 129" in this example). The information can include the title 511 of the video group, the number of subscribers 512 to the video group, and video information elements 520, 530, and 540 for a portion of the videos in the video group.

The video information element 520 includes an image 525 for a video, which can be a screenshot from the video or another image representative of the video. The video information element 520 also includes a title 523 for the video, and user interface controls 521 that enables the user to add keywords for the video to the set of keywords used to identify the set of candidate video groups for the video group package.

The keywords for which user interface controls 521 are displayed for a video can be keywords of the annotations assigned to the video, as described above. For example, these keywords can include the knowledge graph entities recognized in the video and/or in text associated with the video (e.g., text in the title, user comments, etc.).

The user interface controls 521 can enable the user to add a keyword to the set of keywords as a positive keyword or a negative keyword. For example, a first user interaction with a user interface control 521 for a keyword can designate the keyword to be added as a positive keyword, as shown by the user interface control 521A. A second user interaction with the user interface control for a keyword can adjust the keyword from a positive keyword to a negative keyword, as shown by the user interface control 521B. A third user interaction with a user control 521 that is currently designating a negative keyword can adjust the keyword from a negative keyword to a non-selected keyword. The video information elements 530 and 540 can include similar information and user interfaces controls for their respective videos as the video information element 520.

After making any refinements using the video group information element 510, the user can return to the user interface 400. At the user interface 400, the user can update the candidate groups using the refresh channels control 430, which would update the set of candidate video groups based on the keyword selections made using the video group information element 510. That is, the video application 112 can send, to the video platform 130, the current set of seed video groups, the updated set of keywords, and any other settings (e.g., filter settings). The video platform 130 can then provide data for the updated set of candidate videos to the video application 112 and update the user interface 400 to display the candidate videos in the updated set of candidate videos having the highest and lowest co-interaction scores.

Figure 6:
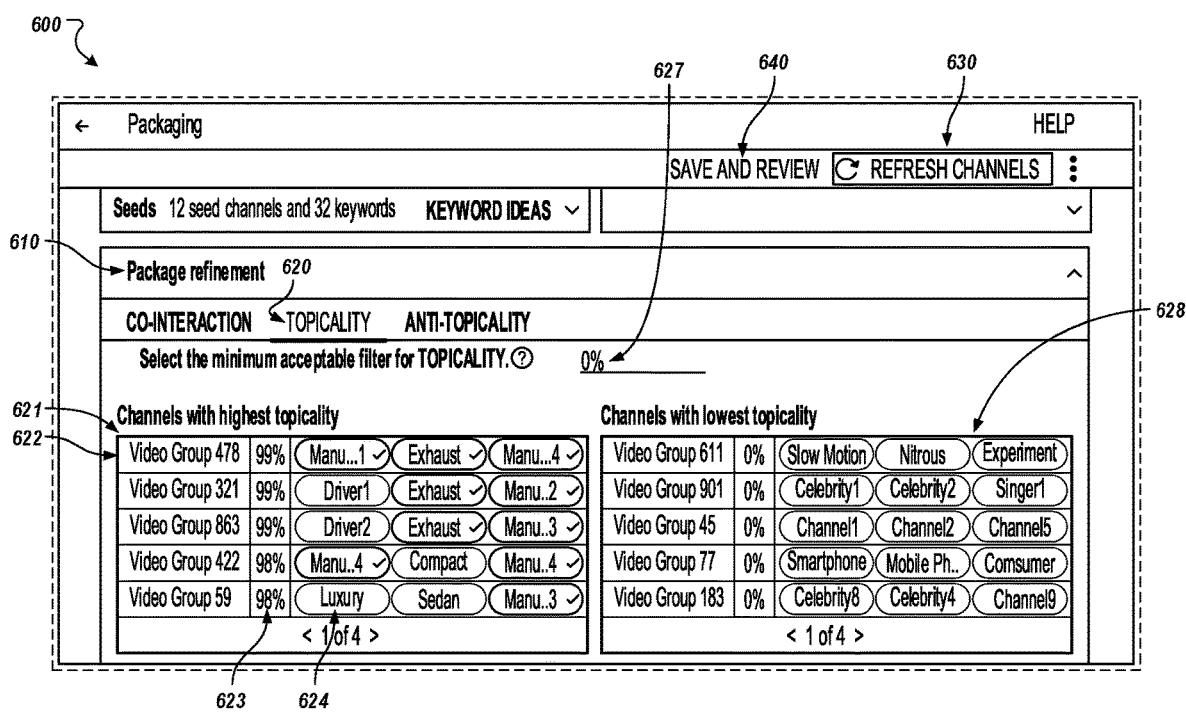
FIG. 6 is an illustration of an example user interface that enables users to refine video groups based on keywords.

FIG. 6 is an illustration of an example user interface 600 that enables users to refine video groups based on keywords. The user interface 600 includes a package refinement user interface element 610 that enables the user to make selections that refine the subset of candidate video groups that will be included in a video group package. The package refinement user interface element 610, which can be the same as or similar to the package refinement user interface element 410, includes a co-interaction tab, a topicality tab 620, and an anti-topicality tab.

In this illustration, the topicality tab 620 is shown. In this tab, information about some of the identified candidate video groups are shown. In particular, a first list 621 of video groups having the highest topicality scores are shown and a second list 628 of video groups having the lowest topicality scores are shown. The candidate video groups shown in this tab can include a portion of the subset of video groups that were identified based on the seed video groups and keywords specified by the user, including any refinements to the seed video groups and/or keywords using the other user interfaces described in this document.

The first list 621 includes, for each video group in the list, a title 622 of the video group, the topicality score 623 for the video group (e.g., calculated based on the current set of keywords) and user interface controls 624 that enable the user to refine the set of keywords. In this example, the user interface 600 can include, for each candidate video group in the list, a user interface control 624 for a specified number of keywords (e.g., three in this example but other numbers are possible) selected from the annotations for the videos in the video group. For example, the video platform 130 can determine, for each annotation in the candidate video group, the total number of videos in the candidate video group that includes the annotation. The video platform 130 can then update the user interface 600 to display a respective user interface control 624 for the keywords having the highest total number of videos.

The user interface controls 624 can be the same as or similar to the user interface controls 521 of FIG. 5. For example, the user interface controls 624 can enable the user to add a keyword to the set of keywords as a positive keyword or a negative keyword. For example, a first user interaction with a user interface control 624 for a keyword can designate the keyword to be added as a positive keyword. A second user interaction with the user interface control 624 for a keyword can adjust the keyword from a positive keyword to a negative keyword. A third user interaction with a user control 624 that is currently designating a negative keyword can adjust the keyword from a negative keyword to a non-selected keyword. The second list 626 includes similar information (e.g., topicality scores) and user interface controls that enable the user to perform similar actions for the video groups having the lowest topicality scores.

The user interface 600 also includes a filter control 627 that enables the user to filter the video groups based on the topicality scores. For example, the filter control 627 enables the user to filter the candidate video groups using a minimum topicality score. The filter control 627 can be used to filter candidate video groups from the candidate video groups that were identified based on the seed video groups and keywords specified by the user. In another example, the filter control 627 can filter the candidate video groups displayed in the user interface 600 without filtering the candidate video groups from the identified video groups, e.g., just for display purposes.

The user interface 600 also includes a refresh channels control 630 that can be used to update the candidate video groups based on any user refinements, e.g., using the filter control 627 or the user interface controls 624. If the user interacts with, e.g., selects the refresh channels control 630, the video platform 130 can identify an updated set of candidate videos based on the current set of seed video groups (e.g., based on the original specified seed videos and any refinements), the current set of keywords (e.g., the original keywords and any refinements using the user interface 500 or the user interface 600), any filter setting made using the filter control 627 (if it affects the selection of candidate video groups). For example, the video application 112 can provide this information (or just the updated information) to the video platform 130 in response to the user interaction with the refresh channels control 630. The video platform 130 can then provide data for the updated set of candidate videos to the video application 112 and update the user interface 600 to display the candidate videos in the updated set of candidate videos having the highest and lowest topicality scores.

The user interface 600 also includes a save and review control 640 that enables the user to save a video package group that includes the candidate video groups currently in the set of candidate video groups. For example, if the user is finished with the refinements, the user can interact with the save and review control 640 to save the video group package. This indicates a selection of the set of candidate video groups as target video groups for the video group package. The user can then assign digital components to the video group package or make the video group package available to other users.

Figure 7:
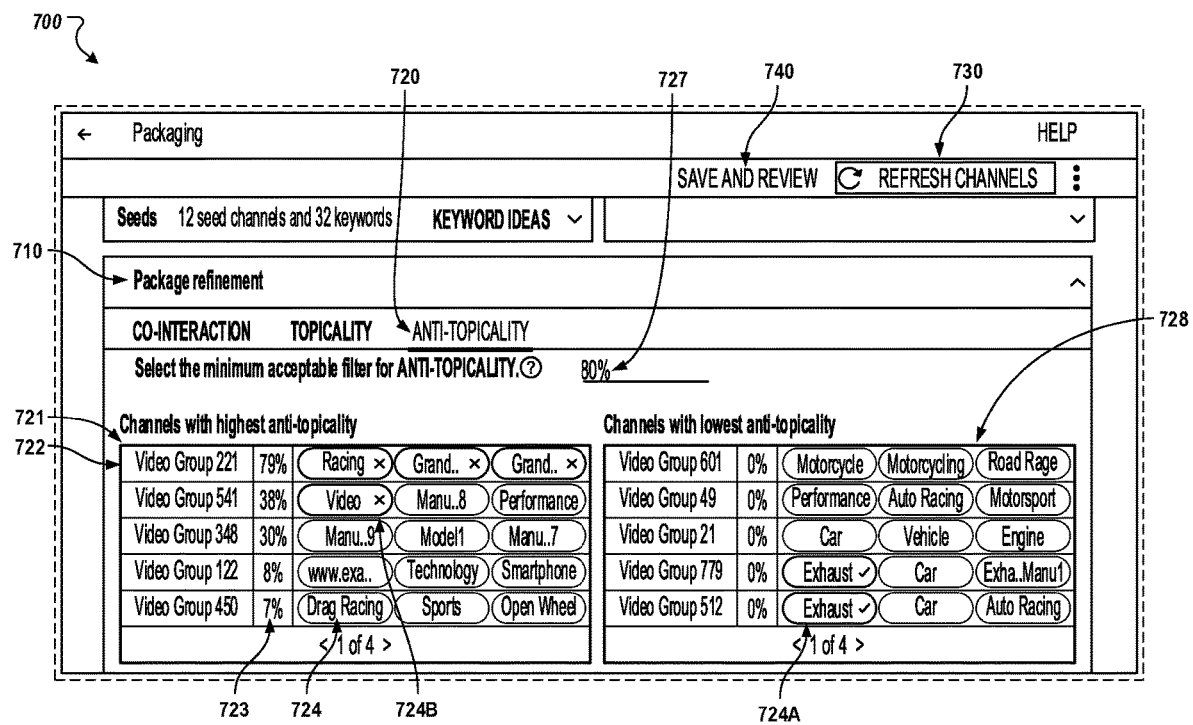
FIG. 7 is an illustration of an example user interface that enables users to refine video groups based on keywords.

FIG. 7 is an illustration of an example user interface 700 that enables users to refine video groups based on keywords. This user interface 700 is similar to the user interface 600 of FIG. 6, but displays information about anti-topicality rather than topicality. As described above, the topicality scores for a candidate video group can be based on positive keywords and anti-topicality scores can be based on negative keywords.

The user interface 700 includes a package refinement user interface element 710 that enables the user to make selections that refine the subset of candidate video groups that will be included in a video group package. The package refinement user interface element 710, which can be the same as or similar to the package refinement user interface element 710, includes a co-interaction tab, a topicality tab, and an anti-topicality tab 720.

In this illustration, the anti-topicality tab 720 is shown. In this tab, information about some of the identified candidate video groups are shown. In particular, a first list 721 of video groups having the highest anti-topicality scores are shown and a second list 728 of video groups having the lowest anti-topicality scores are shown. The candidate video groups shown in this tab can include a portion of the subset of video groups that were identified based on the seed video groups and keywords specified by the user, including any refinements to the seed video groups and/or keywords using the other user interfaces described in this document.

The first list 721 includes, for each video group in the list, a title 722 of the video group, the anti-topicality score 723 for the video group (e.g., calculated based on the current set of keywords) and user interface controls 724 that enable the user to refine the set of keywords. In this example, the user interface 700 can include, for each candidate video group in the list, a user interface control 724 for a specified number of keywords (e.g., three in this example but other numbers are possible) selected from the annotations for the videos in the video group. For example, the video platform 130 can determine, for each annotation in the candidate video group, the total number of videos in the candidate video group that includes the annotation. The video platform 130 can then update the user interface 700 to display a respective user interface control 724 for the keywords having the highest total number of videos.

The user interface controls 724 can be the same as or similar to the user interface controls 624 of FIG. 6. For example, the user interface controls 724 can enable the user to add a keyword to the set of keywords as a positive keyword or a negative keyword. For example, a first user interaction with a user interface control 724 for a keyword can designate the keyword to be added as a positive keyword, as shown by the user interface control 724A. A second user interaction with the user interface control 724 for a keyword can adjust the keyword from a positive keyword to a negative keyword, as shown by user interface control 724B. A third user interaction with a user control 724 that is currently designating a negative keyword can adjust the keyword from a negative keyword to a non-selected keyword. The second list 726 includes similar information (e.g., anti-topicality scores) and user interface controls that enable the user to perform similar actions for the video groups having the lowest anti-topicality scores.

The user interface 700 also includes a filter control 727 that enables the user to filter the video groups based on the anti-topicality scores. For example, the filter control 727 enables the user to filter the candidate video groups using a maximum anti-topicality score. The filter control 727 can be used to filter candidate video groups from the candidate video groups that were identified based on the seed video groups and keywords specified by the user. In another example, the filter control 727 can filter the candidate video groups displayed in the user interface 700 without filtering the candidate video groups from the identified video groups, e.g., just for display purposes.

The user interface 700 also includes a refresh channels control 730 that can be used to update the candidate video groups based on any user refinements, e.g., using the filter control 727 or the user interface controls 724. If the user interacts with, e.g., selects the refresh channels control 730, the video platform 130 can identify an updated set of candidate videos based on the current set of seed video groups (e.g., based on the original specified seed videos and any refinements), the current set of keywords (e.g., the original keywords and any refinements using the user interfaces 500, 600, and/or 700), any filter setting made using the filter control 727 (if it affects the selection of candidate video groups). For example, the video application 112 can provide this information (or just the updated information) to the video platform 130 in response to the user interaction with the refresh channels control 730. The video platform 130 can then provide data for the updated set of candidate videos to the video application 112 and update the user interface 700 to display the candidate videos in the updated set of candidate videos having the highest and lowest topicality scores.

The user interface 700 also includes a save and review control 740 that enables the user to save a video package group that includes the candidate video groups currently in the set of candidate video groups. For example, if the user is finished with the refinements, the user can interact with the save and review control 740 to save the video group package. This indicates a selection of the set of candidate video groups as target video groups for the video group package. The user can then assign digital components to the video group package or make the video group package available to other users.

Figure 8:
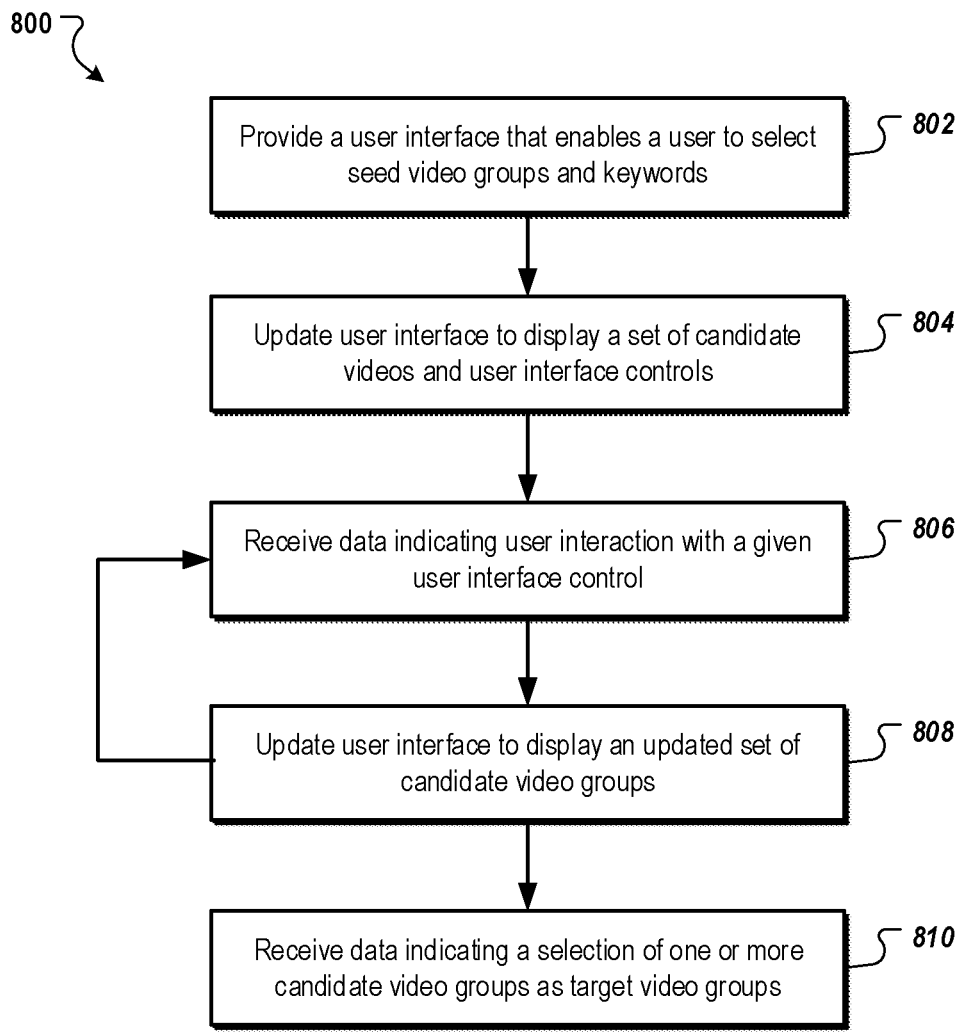
FIG. 8 is a flow diagram that illustrates an example process for refining a set of candidate video groups for user selection.

FIG. 8 is a flow diagram that illustrates an example process 800 for refining a set of candidate video groups for user selection. Operations of the process 800 can be implemented, for example, by the video platform 130. Operations of the process 800 can also be implemented as instructions stored on one or more computer readable media which may be non-transitory, and execution of the instructions by one or more data processing apparatus can cause the one or more data processing apparatus to perform the operations of the process 800.

A user interface that enables a user to select seed video groups and keywords is provider (802). For example, the video platform 130 can generate or update a user interface of the video application 112 of a client device 110 to display the user interface. The user interface can be the user interface 300 of FIG. 3. A user can interact with this user interface to specify one or more seed video groups and one or more keywords (e.g., to define topicality) that will be used to select an initial set of candidate video groups for inclusion in a video group package. After the seed video groups and keywords are specified, the video application 112 can send data indicating the seed video groups and keywords to the video platform 130.

The user interface is updated to display a set of candidate videos and user interface controls (804). The video platform 130 can select the set of candidate videos based on the seed video group(s) and the keyword(s). For example, the video platform 130 can select the candidate video groups using the process 200 of FIG. 2.

The video platform can then update the user interface to display at least a subset of the candidate videos and the user interface controls. For example, the video platform 130 can provide data indicating the set of candidate videos and information about the candidate video groups (e.g., topicality scores, anti-topicality scores, co-interaction scores, subscription counts, etc.) to the video application 112. Depending on the currently displayed user interface at the video application 112, the video application 112 can display a particular subset of the candidate videos. For example, if the co-interaction tab is being displayed, the user interface can display a subset of the candidate videos based on co-interaction scores, as shown in FIG. 4.

The user interface controls enable the user to refine the set of candidate videos, e.g., based on seed video groups and/or keywords. For example, as shown in FIG. 4, user interface controls 424 that enable the user to add positive and/or negative seed video groups can be displayed. In another example, as shown in FIG. 6, user interface controls 624 that enable a user to add positive and/or negative keywords can be displayed. The user can navigate between tabs in the user interfaces of FIGS. 3-8 to add and/or remove seed video groups (e.g., positive and/or negative seed video groups) and/or keywords (e.g., positive and/or negative keywords).

Data indicating user interaction with a given user interface control is received (806). For example, the video application 112 can detect user interaction with the user interface controls and provide data indicating the interaction to the video platform 130. This data can indicate the seed video group or keyword corresponding to the user interface control and whether the seed video group or keyword is being added or removed. If being added, the data can include data indicating whether the seed video group or keyword is being added as a positive or negative seed video group or keyword. In some implementations, the video application 112 can provide this data for each user interface control interacted with in response to a user request, e.g., in response to the user interacting with a refresh channels control.

The user interface is updated to display an updated set of candidate videos (808). The video platform 130 can select an updated set of candidate videos based on the current set of seed video groups and the current set of keywords. The current set of seed video groups and the current set of keywords can be based on the initial seed video group(s) and keyword(s) specified in operation 802 and any refinements (e.g., additions or removals) made in operation 806. The video platform 130 can select the updated set of candidate video groups using the process 200 of FIG. 2 based on the current set of seed video groups and keywords.

The video platform 130 can then update the user interface at the video application 112 to display at least a subset of the updated set of candidate video groups. For example, the video platform 130 can provide data indicating the updated set of candidate videos and information about the candidate video groups (e.g., topicality scores, anti-topicality scores, co-interaction scores, subscription counts, etc.) to the video application 112. Depending on the currently displayed user interface at the video application 112, the video application 112 can display a particular subset of the candidate videos. For example, if the topicality tab is being displayed, the user interface can display a subset of the candidate videos based on topicality scores, as shown in FIG. 6.

Data indicating a selection of one or more candidate video groups as target video groups is received (810). The user can perform one or more iterations of refinements using operations 806 and 808. When the set of candidate video groups is acceptable to the user, the user can select the candidate video groups for the video group package, e.g., by interacting with a save and review control. The user can then review the target video groups and their associated information. The user can also assign content (e.g., digital components) to the target video groups and/or make the video group package available to other users.

Figure 9:
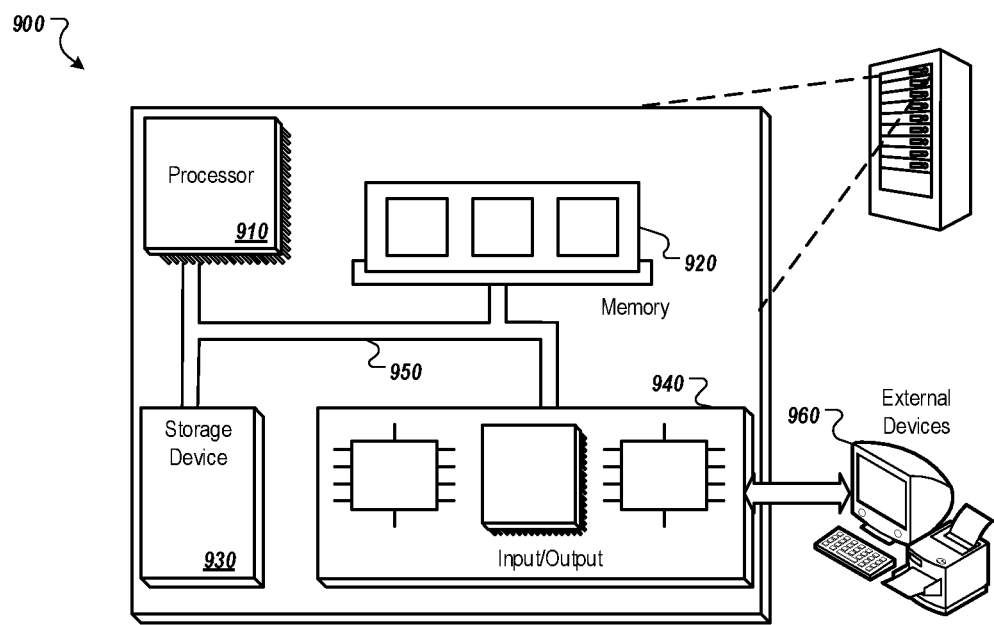
FIG. 9 is a block diagram of an example computer system.

FIG. 9 is a block diagram of an example computer system 900 that can be used to perform operations described above. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In some implementations, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In some implementations, the memory 920 is a volatile memory unit. In another implementation, the memory 920 is a non-volatile memory unit.

The storage device 930 is capable of providing mass storage for the system 1000. In some implementations, the storage device 930 is a computer-readable medium. In various different implementations, the storage device 930 can include, for example, a hard disk device, an optical disk device, a storage device that is shared over a network by multiple computing devices (e.g., a cloud storage device), or some other large capacity storage device.

The input/output device 940 provides input/output operations for the system 1000. In some implementations, the input/output device 940 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 960, e.g., keyboard, printer and display devices. Other implementations, however, can also be used, such as mobile computing devices, mobile communication devices, set-top box television client devices, etc.

Although an example processing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:
1. A computer-implemented method comprising:
receiving, from a computing system of a digital component provider, data indicating one or more seed video groups that each include one or more seed videos;

receiving, from the computing system of the digital component provider, data indicating one or more keywords;

identifying a set of candidate video groups that each include one or more candidate videos;

for each candidate video group in the set of candidate video groups:

determining a co-interaction score that represents a measure of how often users who have interacted with the one or more seed videos of the one or more seed video groups also interacted with at least one of the one or more videos of the candidate video group; and determining a topicality score that represents a measure of topicality between the one or more keywords indicated in the received data that indicates the one or more keywords and the one or more videos of the candidate video group;

selecting a subset of the candidate video groups based on the co-interaction score and the topicality score of each candidate video group; and providing, to the computing system of the digital component provider, data indicating the subset of candidate video groups for display.

2. The computer-implemented method of claim 1, further comprising:

receiving, from the computing system of the digital component provider, data indicating a user selection of a given candidate video group of the subset of candidate video groups;

including the given candidate video group in a video group package; and distributing digital components of the digital component provider to client devices for display with at least one of the one or more videos in the given candidate video group.

3. The computer-implemented method of claim 1, wherein determining the co-interaction score for each candidate video group comprises determining the co-interaction score for each candidate video group using collaborative filtering.

4. The computer-implemented method of claim 1, wherein determining the co-interaction score for each candidate video group comprises determining a quantity of user interactions with the one or more videos of the candidate video group that were performed by users who also interacted with videos of the one or more seed video groups.

5. The computer-implemented method of claim 1, wherein:

the one or more seed video groups comprise one or more positive seed video groups and one or more negative seed video groups;

determining the co-interaction score for each candidate video group comprises:

determining a first quantity of user interactions with the one or more videos of the candidate video group that were performed by users who also interacted with videos of the one or more positive seed video groups;

determining a second quantity of user interactions with the one or more videos of the candidate video group that were performed by users who also interacted with videos of the one or more negative seed video groups; and determining the co-interactions score for the candidate video group based on the first quantity and the second quantity.

6. The computer-implemented method of claim 4, wherein:

each seed video group and each candidate video group comprises a respective video channel of a video sharing platform; and each user interaction comprises a subscription to one of the video channels.

7. The computer-implemented method of claim 1, wherein the co-interaction score for each candidate video group is based on a similarity between patterns of user interactions with the one or more seed videos of the one or more seed video groups and patterns of user interactions with the one or more videos of the candidate video group.

8. The computer-implemented method of claim 7, wherein each pattern of user interaction is based on at least one of display times of videos, a frequency at which each video is displayed, or subscriptions to video groups.

9. The computer-implemented method of claim 1, wherein:

each candidate video comprises one or more annotations selected based on at least one of (i) content of the candidate video, (ii) a title of the candidate video, (iii) a description of the candidate video, or (iv) user comments posted about the candidate video; and determining the topicality score that represents the measure of topicality between the one or more keywords and the one or more videos of the candidate video group comprises determining a quantity of the one or more videos in the candidate video group that has an annotation that includes at least one of the one or more keywords.

10. The computer-implemented method of claim 9, wherein determining the topicality score that represents the measure of topicality between the one or more keywords and the one or more videos of the candidate video group comprises determining a ratio between (i) the quantity of the one or more videos in the candidate video group that has an annotation that includes at least one of the one or more keywords and (ii) a quantity of the one or more videos in the candidate video group that does not have an annotation that includes at least one of the one or more keywords.

11. The computer-implemented method of claim 9, further comprising:

receiving data indicating a set of one or more negative keywords;

for each candidate video group, determining an anti-topicality score that represents a measure of topicality between the one or more negative keywords and the one or more videos of the candidate video group; and filtering, from the set of candidate video groups, each candidate video group having an anti-topicality score that satisfies a threshold.

12. A system comprising:

one or more processors; and one or more storage devices storing instructions that, when executed by the one or more processors, cause the one or more processor to perform operations comprising:

receiving, from a computing system of a digital component provider, data indicating one or more seed video groups that each include one or more seed videos;

receiving, from the computing system of the digital component provider, data indicating one or more keywords;

identifying a set of candidate video groups that each include one or more candidate videos;

for each candidate video group in the set of candidate video groups:

determining a co-interaction score that represents a measure of how often users who have interacted with the one or more seed videos of the one or more seed video groups also interacted with at least one of the one or more videos of the candidate video group; and determining a topicality score that represents a measure of topicality between the one or more keywords indicated in the received data that indicates the one or more keywords and the one or more videos of the candidate video group;

selecting a subset of the candidate video groups based on the co-interaction score and the topicality score of each candidate video group; and providing, to the computing system of the digital component provider, data indicating the subset of candidate video groups for display.

13. The system of claim 12, wherein the operations comprise:

receiving, from the computing system of the digital component provider, data indicating a user selection of a given candidate video group of the subset of candidate video groups;

including the given candidate video group in a video group package; and distributing digital components of the digital component provider to client devices for display with at least one of the one or more videos in the given candidate video group.

14. The system of claim 12, wherein determining the co-interaction score for each candidate video group comprises determining the co-interaction score for each candidate video group using collaborative filtering.

15. The system of claim 12, wherein determining the co-interaction score for each candidate video group comprises determining a quantity of user interactions with the one or more videos of the candidate video group that were performed by users who also interacted with videos of the one or more seed video groups.

16. The system of claim 12, wherein:

the one or more seed video groups comprise one or more positive seed video groups and one or more negative seed video groups;

determining the co-interaction score for each candidate video group comprises:

determining a first quantity of user interactions with the one or more videos of the candidate video group that were performed by users who also interacted with videos of the one or more positive seed video groups;

determining a second quantity of user interactions with the one or more videos of the candidate video group that were performed by users who also interacted with videos of the one or more negative seed video groups; and determining the co-interactions score for the candidate video group based on the first quantity and the second quantity.

17. The system of claim 15, wherein:

each seed video group and each candidate video group comprises a respective video channel of a video sharing platform; and each user interaction comprises a subscription to one of the video channels.

18. The system of claim 12, wherein the co-interaction score for each candidate video group is based on a similarity between patterns of user interactions with the one or more seed videos of the one or more seed video groups and patterns of user interactions with the one or more videos of the candidate video group.

19. The system of claim 18, wherein each pattern of user interaction is based on at least one of display times of videos, a frequency at which each video is displayed, or subscriptions to video groups.

20. A non-transitory computer readable medium carrying instructions that, when executed by one or more processors, cause the one or more processors to perform operations comprising:

receiving, from a computing system of a digital component provider, data indicating one or more seed video groups that each include one or more seed videos;

receiving, from the computing system of the digital component provider, data indicating one or more keywords;

identifying a set of candidate video groups that each include one or more candidate videos;

for each candidate video group in the set of candidate video groups:

determining a co-interaction score that represents a measure of how often users who have interacted with the one or more seed videos of the one or more seed video groups also interacted with at least one of the one or more videos of the candidate video group; and determining a topicality score that represents a measure of topicality between the one or more keywords indicated in the received data that indicates the one or more keywords and the one or more videos of the candidate video group;

selecting a subset of the candidate video groups based on the co-interaction score and the topicality score of each candidate video group; and providing, to the computing system of the digital component provider, data indicating the subset of candidate video groups for display.

21. The computer-implemented method of claim 1, wherein selecting a subset of the candidate video groups is further based on annotations assigned to the one or more candidate videos of the candidate video groups, wherein one or more of the annotations are designated as a positive keyword or a negative keyword.

* * * * *